United States Patent
Chang

(10) Patent No.: US 6,427,177 B1
(45) Date of Patent: Jul. 30, 2002

(54) METHOD AND APPARATUS FOR CONFIGURING MULTIPLE DEVICES IN A COMPUTER SYSTEM

(75) Inventor: Ek Ka Chang, Markham (CA)

(73) Assignee: ATI International SrL, Barbados (BB)

( * ) Notice: Subject to any disclaimer, the term of this patent is extended or adjusted under 35 U.S.C. 154(b) by 0 days.

(21) Appl. No.: 09/412,026

(22) Filed: Oct. 4, 1999

(51) Int. Cl.[7] .................. G06F 13/10; G06F 13/12

(52) U.S. Cl. ................ 710/8; 710/10; 710/15; 710/16; 710/17; 710/18; 710/19

(58) Field of Search ............... 710/8, 10, 15, 710/16, 17, 18, 19

(56) References Cited

U.S. PATENT DOCUMENTS

| | | | | |
|---|---|---|---|---|
| 4,835,685 A | * | 5/1989 | Kun | 710/260 |
| 5,819,112 A | * | 10/1998 | Kusters | 710/36 |
| 6,064,406 A | * | 5/2000 | Atkinson et al. | 713/100 |

* cited by examiner

*Primary Examiner*—Jeffrey Gaffin
*Assistant Examiner*—Mohammad O. Farooq
(74) *Attorney, Agent, or Firm*—Vedder, Price, Kaufman & Kammholz

(57) ABSTRACT

A method and apparatus for configuring multiple devices in a computer system is presented. Upon receipt of a device enumeration request corresponding to a first device, an indication that the first device is inoperable is returned. In response to a second device enumeration request corresponding to a second device, an indication of the capabilities of the second device is returned. When a configuration command corresponding to the second device is received, configuration information derived based on the configuration command is provided to both the first and second devices such that uniform parameter configuration is achieved with respect to the first and second devices. Because the operating system that issues the device enumeration request is informed that the first device is inoperable, the first device will be rendered unconfigurable and therefore configuration commands addressed to the first device will not be generated by the operating system.

21 Claims, 3 Drawing Sheets

METHOD AND APPARATUS FOR CONFIGURING MULTIPLE DEVICES IN A COMPUTER SYSTEM

FIELD OF THE INVENTION

The invention relates generally to processing systems, and more particularly to a method and apparatus for configuring multiple devices in a computer system.

BACKGROUND OF THE INVENTION

Computing systems such as personal computers include operating systems that, among other things, allow users to configure the computing system according to their particular needs. For example, the operating system may allow the user to configure the display of the computing system such that the resolution, color depth, or similar parameters of the display can be set as the user desires. As computing systems continue to evolve, the advantages to allowing multiple devices to cooperate in processing operations becomes increasingly apparent. Multiple devices performing tasks in a cooperative manner (parallel processing) can increase the speed with which the processing can be performed, and therefore add to the complexity of the processing operations that can be performed within a particular time period.

Operating systems typically poll the configuration space of a computing system upon start up in order to determine the devices that are included in the processing system. For example, the operating system may poll the configuration space and determine that a video graphics processing card that includes a graphics processor is present within the computing system. In the case where multiple devices are included on a peripheral circuit, an expansion card, or within a similar portion of the processing system, the multiple devices will each correspond to a different portion of the configuration space within the processing system. This allows each of the devices to be treated individually over a shared bus structure. Configuring the computing system such that different devices exist at different portions of the configuration space is well known in the art.

Problems can arise when multiple devices that perform cooperative processing operations exist within the processing system. This is because the operating system will recognize each of the devices based on their identification when the configuration space is polled at start up. In other words, when the operating system starts up and polls the configuration space, each of the devices will respond, thus indicating its presence. Because the operating system recognizes each of the devices, users will be allowed to configure each of the devices individually. Individual configuration of multiple devices that perform cooperative processing operations can cause problems when the cooperative processing operations involve specific parameters that require uniform settings between the multiple devices. For example, if two graphics devices are included in a graphics processing card, the user could potentially configure one device to a particular resolution and the other device to a different resolution. If this scenario were to occur, the processing operations performed by the devices would differ significantly, thus corrupting the resulting display.

Therefore, a need exists for a method and apparatus that allows multiple devices to be configured in a uniform manner that ensures that conflicts do not arise in cooperative processing operations.

DETAILED DESCRIPTION OF A PREFERRED EMBODIMENT OF THE INVENTION

Generally, the present invention provides a method and apparatus for configuring multiple devices in a computer system. Upon receipt of a device enumeration request corresponding to a first device, an indication that the first device is inoperable is returned. In response to a second device enumeration request corresponding to a second device, an indication of the capabilities of the second device is returned. When a configuration command corresponding to the second device is received, configuration information derived based on the configuration command is provided to both the first and second devices such that uniform parameter configuration is achieved with respect to the first and second devices. Because the operating system that issues the device enumeration request is informed that the first device is inoperable, the first device will be rendered unconfigurable and therefore configuration commands addressed to the first device will not be generated by the operating system. However, when configuration commands corresponding to the second device, which is operating in cooperation with the first device, are received, the parameter configurations are performed to both the first and second devices in a uniform manner that promotes cooperative processing operations.

In another embodiment of the invention, the first and second devices each support a different set of device capabilities. In this embodiment, a portion of the device capabilities supported by the first device may also be supported by the second device. When the configuration of some of the parameters corresponding to these capabilities are used in cooperative processing operations, dissimilar settings for these property values may disrupt the cooperative processing efforts. As such, the device enumeration request corresponding to the first device is responded to with an indication that the first device is inoperable. The response to the second device enumeration request corresponding to the second device is responded to with an indication of a combined set of device capabilities where the combined set of device capabilities includes the device capabilities supported by both the first and second devices. When a configuration command corresponding to the second device is subsequently received, it is determined to which of the first and second devices the configuration command corresponds. If the configuration command corresponds to a particular parameter of a device capability possessed by both the first and second devices, the configuration command will correspond to both devices. The configuration information generated based on the configuration command is then provided to the appropriate device or devices. As such, shared device capability parameters are uniformly configured with respect to the first and second devices. At the same time, individual device capability parameters are also supported.

Figure 1:
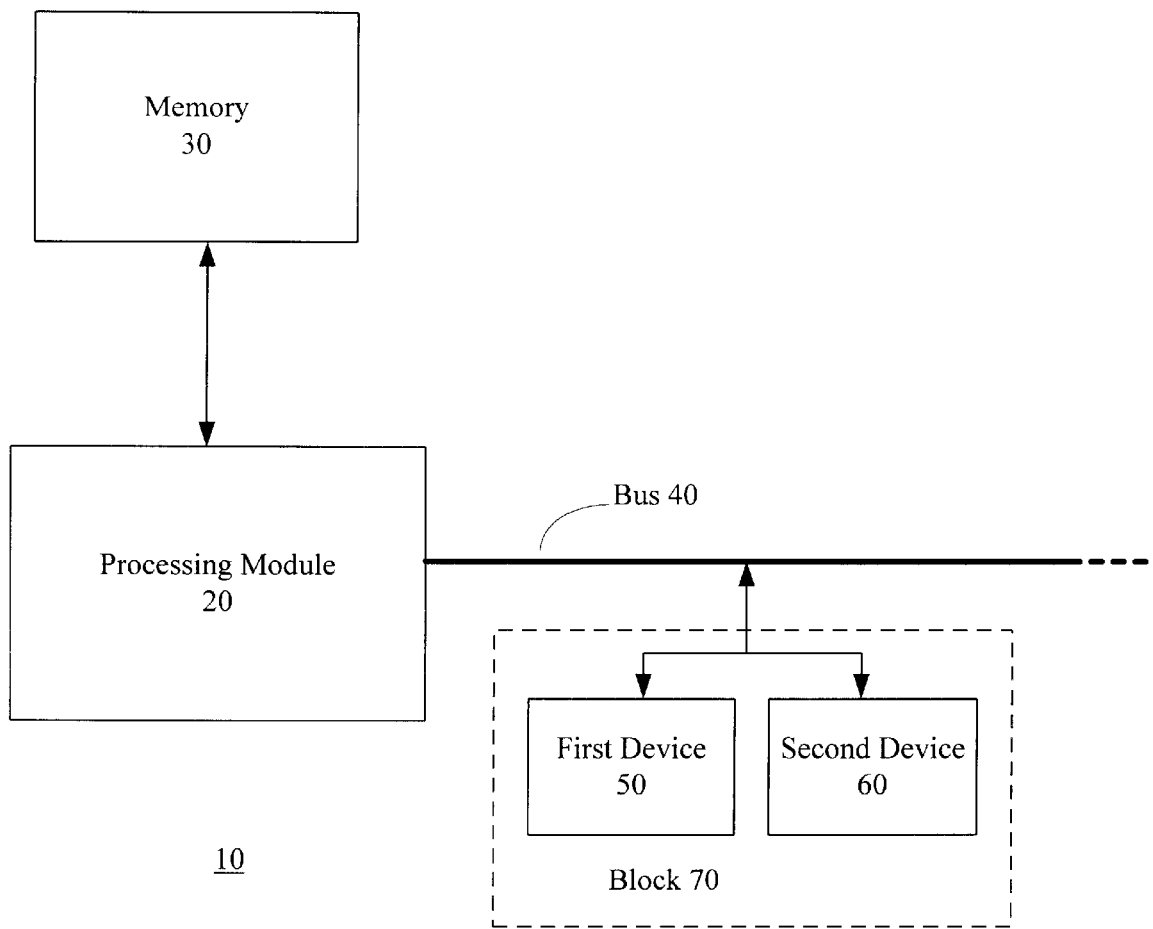
FIG. 1 illustrates a block diagram of a processing system in accordance with a particular embodiment of the present invention.
Figure 2:
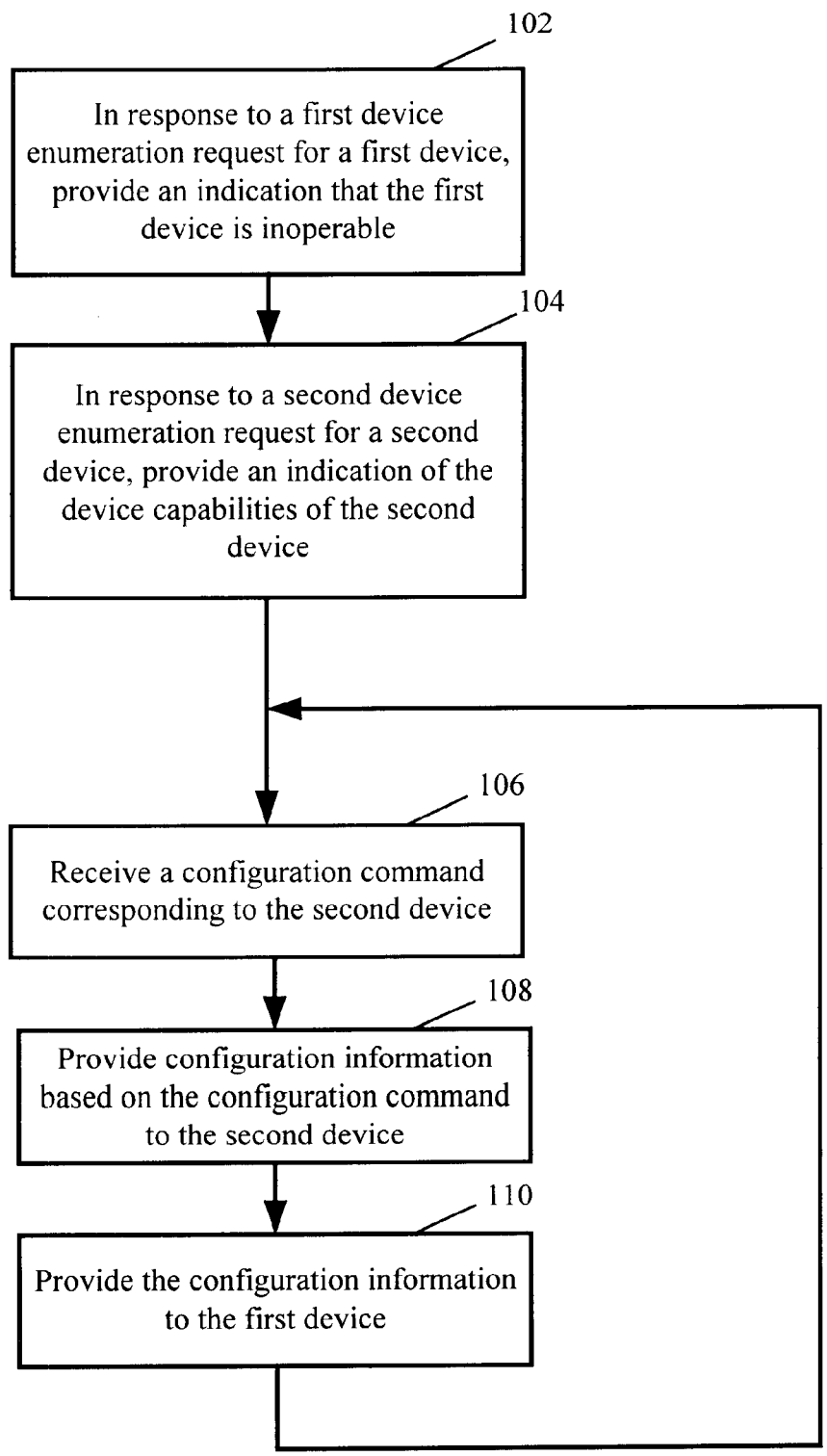
FIG. 2 illustrates a flow diagram of a method for configuring multiple devices in a computer system in accordance with a particular embodiment of the present invention.
Figure 3:
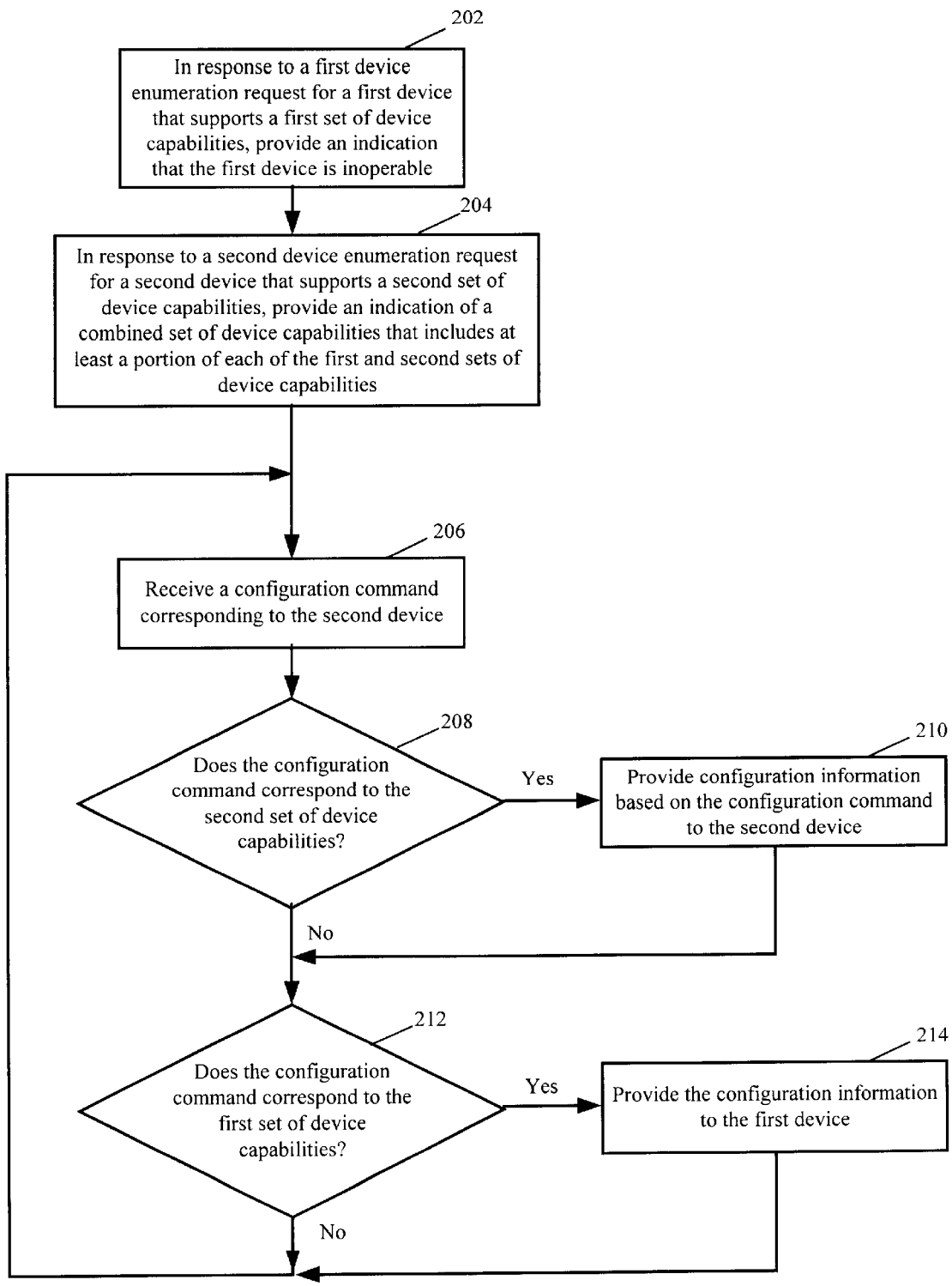
FIG. 3 illustrates a flow diagram of an alternate method for configuring multiple devices in a computer system in accordance with a particular embodiment of the present invention.

The invention can be better understood with reference to FIGS. 1–3. FIG. 1 illustrates a processing system 10 that includes a processing module 20, memory 30, a bus 40, a first device 50 and a second device 60. The processing system 10 may be a processing system such as a personal computer where the processing module 20 is the central processing unit (CPU) of the personal computer. The bus 40 provides an interconnection means for the first and second devices 50 and 60 to interact with the processing module 20, and possibly with additional devices coupled to the bus 40. In one embodiment, the bus 40 is an accelerated graphics protocol (AGP) bus that is a standard bus structure, and the protocol for which is well known in the art. The AGP bus structure expands on the protocol of the peripheral component interconnect (PCI) bus standard.

In an embodiment where the processing system 10 is a personal computer, an operating system will exist that controls some of the interactions amongst the various components of the processing system. The operating system provides users of the processing system with a user interface that allows the user to interact with the processing system. One interaction which the operating systems supports is the configuration of different devices included within the processing system.

In operating systems such as the WINDOWS operating system as developed by the Microsoft Corporation, the operating system will detect the various devices included in the processing system upon start up. Thus, when the operating system is initiated, it will poll the configuration space of the processing system to determine which devices are included in the processing system. The configuration space of the processing system includes the address space accessible via the bus 40. Each device that is detected by the operating system is preferably an intelligent device that includes distinct PCI configuration data.

In order for multiple devices to operate on the bus 40, each of the devices occupies a portion of the configuration space of the processing system. As such, different addresses asserted on the bus 40 will allow for interaction with different devices. When the operating system polls the configuration space to determine the presence of various devices, each device responds in turn when its particular portion of the configuration space is polled. As such, the operating system will detect both the first device 50 and the second device 60 included in the processing system 10.

In prior art systems, the operating system would permit user configuration of the first device 50 and the second device 60 individually such that different configurations could be applied to the first device 50 and the second device 60. Allowing for different configuration of these devices in such prior art systems can have negative consequences when the first and second devices 50 and 60 perform cooperative processing functions. For example, if the first and second devices are graphics processing devices that perform rendering operations for a display, setting the resolution of the first device 50 to one setting and the resolution of the second device 60 to a different setting will produce corrupted results. Because of this, such prior art processing systems must rely on users to avoid configuring cooperative devices in a non-uniform manner.

By ensuring that the two devices cannot be configured in a manner that would disrupt the cooperative processing, the present invention avoids potential configuration conflicts. In order to ensure that the devices are not configured differently, the device driver that corresponds to the first and second devices 50 and 60 responds to the device enumeration request issued by the operating system subsequent to configuration space polling in a manner that indicates that one of the two devices is inoperable. As such, the operating system will not allow configuration of the inoperable device. When the device driver receives a configuration command corresponding to the device that has been enumerated as an operable device, configuration information is provided to both the first and second devices 50 and 60 such that uniform configuration is achieved. As such, cooperative processing functions can continue without any danger of conflicting settings.

Preferably, the processing module 20 executes operational instructions stored by the memory 30 such that it performs the functions of maintaining the operating system and maintaining the device driver. Thus, the operating system and the device driver are preferably software instantiations that interact within the processing system. The first and second devices 50 and 60 may be included in a block 70, which may be an expansion card within a personal computer. In one embodiment, the block 70 is a video graphics processing circuit or expansion card in which the first and second devices are both graphics processing devices. The first and second devices 50 and 60 may be substantially similar graphics processing devices such that the parameters that may be configured by the operating system for both the first and second devices 50 and 60 are also substantially similar. The first and second devices 50 and 60 may cooperatively perform graphics processing functions such as rendering operations, where the cooperative processing by these two devices enables higher speed and/or more complex graphics processing operations to occur. In such embodiments, the substantially similar graphics processing devices each include a set of configuration parameters that can be configured using configuration commands. Such configuration parameters can include parameters associated with display resolution, color depth, texture processing, brightness, gamma correction, refresh rate, etc.

In an embodiment where the bus 40 is an AGP bus, the teachings provided herein may be used in conjunction with those in co-pending patent application entitled "Method and Apparatus for Supporting Multiple Bus Masters with the Accelerated Graphics Protocol (AGP) Bus" having attorney docket number 0100.9901130 which was filed on the same date as the present application and is incorporated herein by reference. Combining the teachings of the two inventions provides the ability to include multiple devices on a shared bus structure where each of the devices has bus mastering capabilities and where uniform configuration of the devices is possible.

FIG. 2 illustrates a flow diagram of a method for configuring multiple devices in a computer system. As was described with respect to FIG. 1, the multiple devices may be graphics processing devices that are substantially similar such that they share a set of configuration parameters. As is apparent for one of ordinary skill in the art, the teachings provided herein are also applicable to any set of two or more devices which share configuration parameters that require uniform parameter settings amongst the set of devices. In the case where the multiple devices are graphics processing devices that may be included in a video graphics processing circuit, one of the cooperative function that may be performed by the devices is graphics rendering operations. Parameters associated with graphics rendering operations that should be maintained in a uniform manner between the multiple devices include resolution, color depth, texture processing, brightness, gamma correction, refresh rate, and the like.

As stated earlier, upon start up of an operating system, the operating system will determine the devices present in its configuration space. Based on the results of scanning the configuration space, the operating system will query various device drivers corresponding to the devices to determine the device capabilities of each of the devices. Such queries are often referred to as device enumeration requests. The operating system will then enable or disable user interaction with the various devices based on responses received to the device enumeration requests. The method of FIG. 2 begins at step 102 where a first device enumeration request corresponding to a first device is received. In response, an indication that the first device is inoperable is provided. The indication that the first device is inoperable may take the form of any indication that will cause the operating system to disallow configuration commands to be issued with respect to the first device.

At step 104, a second device enumeration request corresponding to a second device is received. In response to the second device enumeration request, an indication of device capabilities of the second device is provided. Preferably the first and second devices are substantially similar devices that includes substantially similar device capabilities that are configured based on a set of configuration parameters. Preferably, each device maintains its own set of configuration parameters independent of the other device. The indication provided to the operating system at step 104 will enable the operating system to provide the capability for users to configure the second device based on its capabilities. Note that ordering of steps 102 and 104 is arbitrary, and the illustration of FIG. 2 should not be understood to imply that step 102 must occur prior to step 104.

When the operating system wishes to alter the settings of a configuration: parameter corresponding to a device capability, a configuration command will be provided to the device driver corresponding to the device. At step 106, after the indications have been provided in response to the device enumeration requests, a configuration command corresponding to the second device is received.

Because the first and second devices need to be uniformly configured, the configuration information generated based on the configuration command is provided to both the second and first devices at steps 108 and 110, respectively. As was the case with steps 102 and 104 above, the ordering of steps 108 and 110 is arbitrary, and the ordering implied by FIG. 2 should not be viewed as a requirement that the execution of step 108 must precede step 110. Thus, the same configuration information provided to the second device at step 108 is provided to the first device at step 110. Although the operating system believes it is only configuring the second device as the first device is in it's eyes inoperable and therefore not configurable, both devices are in fact being configured by the single configuration command. As such, configuration parameters used in cooperative processing operations by both the first and second devices will be updated jointly. This ensures that both devices operate with the same settings.

FIG. 3 illustrates an alternate embodiment of the invention in which a method for configuring multiple devices in a computer system is presented. In the system to which the method of FIG. 3 applies, each of the devices shares certain capabilities and therefore includes similar configuration parameters as other devices with which it participates in cooperative processing operations. However, additional capabilities, and therefore configuration parameters, are supported by each device that may not be included in all of the other devices active in the cooperative processing operation's.

The method begins at step 202 where a first device enumeration request corresponding to a first device is received. In response to the first device enumeration request, an indication that the first device is inoperable is returned. The first device in this embodiment supports a first set of device capabilities.

At step 204, a second device enumeration request corresponding to a second device is received. In response, an indication of a combined set of device capabilities is returned. The combined set of device capabilities includes at least a portion of the first set of device capabilities corresponding to the first device and also includes at least a portion of a second set of device capabilities that corresponds to the second device. Thus, if the first device supports capabilities A≧K and the second device supports capabilities F–M, the response provided at step 204 may indicate that the second device in fact supports capabilities A–M. Note that ordering of steps 202 and 204 is arbitrary, and the illustration of FIG. 3 should not be understood to imply that step 202 must occur prior to step 204.

At step 206, a configuration command corresponding to the second device is received. At step 208 it is determined whether or not the configuration command received at step 206 corresponds to a device capability included in the second set of device capabilities. In other words, it is determined whether or not the configuration command applies to a device capability that the second device supports. If it is determined at step 208 that the configuration command corresponds to the second device, the method proceeds to step 210 where configuration information that is based on the configuration command is provided to the second device. The configuration information provided to the second device is preferably in the form of the assertion of the various signals by the device driver that will cause the configuration command issued by the operating system to take effect within the second device.

Subsequent to step 208 and possibly step 210, the method proceeds to step 212 where it is determined whether or not the configuration command corresponds to a device capability included in the first set of device capabilities. Thus, it is determined if the configuration command applies to the first device. If it is determined that the configuration command applies to the first device, the method proceeds to step 214 where the configuration information is applied to the first device. As was the case with steps 202 and 204 above, the ordering of steps 208 and 212 is arbitrary, and the ordering implied by FIG. 3 should not be viewed as a requirement that the execution of step 208 must precede step 212.

Note that the configuration command received at step 206 may apply to either one of the first and second devices or to both of the first and second devices. Referencing the example given directly above, if the configuration command applies to device capabilities A–E, only the second device will receive the configuration information. If the configuration command corresponds to one of the device capabilities L–M, only the first device will receive the configuration information. If the configuration command corresponds to one of the device capabilities F–K, both the first and the second devices will receive the configuration information, as these device capabilities are common device capabilities configured by parameters used in cooperative processing operations.

In another embodiment, the first and second devices may not share any configuration parameters. However, one device could still be reported as inoperable and the complete set of capabilities of the two devices could be reported as the set of, capabilities supported by the operable device. As such, when configuration commands are received corresponding to the operable device, the configuration information could be provided to the device which supports the capability corresponding to the configuration command.

The method and apparatus provided herein enables device drivers to control the flow of information between the operating system and the various devices that may be supported within the processing system. As such, the device drivers can ensure that the operating system does not enable users or other entities to configure cooperating devices in a manner that disrupts their cooperative functionality. By doing so, multiple devices can be included in the system which perform cooperative functions and are able to increase the overall capabilities of the system.

Although the example embodiments described herein have included two devices, it should be apparent to one of ordinary skill in the art that multiple devices could be included in such systems that perform cooperative processing functions. In such systems, the configuration commands from the operating system could be controlled such:that shared parameters between the multiple devices are configured uniformly while unique parameters or those shared only amongst portions of the devices are configured as appropriate. Therefore, maximum flexibility with respect to device interaction can be achieved within a computing system without the danger of dissimilar parameter settings for cooperative processing operations.

It should be understood that the implementation of other variations and modifications of the invention in its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for configuring multiple devices in a computer system, comprising:

in response to a first device enumeration request corresponding to a first device, providing a first indication that the first device is inoperable;

in response to a second device enumeration request corresponding to a second device, providing a second indication of device capabilities of the second device;

after providing the first and second indications, receiving a configuration command corresponding to the second device;

providing configuration information based on the configuration command to the second device; and providing the configuration information to the first device.

2. The method of claim 1, wherein the first and second device enumeration requests are received from an operating system of the computer system.

3. The method of claim 2, wherein the first and second device enumeration requests are received from a Windows-based operating system of the computer system.

4. The method of claim 1, wherein the first and second devices are graphics processing devices.

5. The method of claim 4, wherein the first and second devices are substantially similar graphics processing devices that include a set of configuration parameters that are configured using configuration commands.

6. The method of claim 5, wherein the first and second devices are included in a video graphics processing block, wherein the first and second devices operate cooperatively to perform graphics processing functions.

7. The method of claim 6, wherein graphics processing functions performed by the first and second devices include performing graphics rendering operations.

8. The method of claim 5, wherein the set of configuration parameters configured using configuration commands includes at least one of: resolution, color depth, texture processing, brightness, gamma correction, and refresh rate.

9. A method for configuring multiple devices in a computer system, comprising:

in response to a first device enumeration request corresponding to a first device, providing a first indication that the first device is inoperable, wherein the first device supports a first set of device capabilities;

in response to a second device enumeration request corresponding to a second device, providing a second indication of a combined set of device capabilities, wherein the second device supports a second set of device capabilities, wherein the combined set of device capabilities includes at least a portion of the first set of device capabilities and at least a portion of the second set of device capabilities;

after providing the first and second indications, receiving a configuration command corresponding to the second device;

when the configuration command corresponds to a device capability in the second set of device capabilities, providing configuration information based on the configuration command to the second device; and when the configuration command corresponds to a device capability in the first set of device capabilities, providing the configuration information to the first device.

10. The method of claim 9, wherein the first and second device enumeration requests are received from an operating system of the computer system.

11. The method of claim 10, wherein the first and second device enumeration requests are received from a Windows-based operating system of the computer system.

12. The method of claim 1, wherein common device capabilities are included in each the first and second sets of device capabilities.

13. The method of claim 12, wherein the first and second devices perform cooperative processing operations based at least in part on the common device capabilities.

14. The method of claim 13, wherein at least one of the first and second devices is a graphics processor.

15. A processing system, comprising:

a bus;

a first device operably coupled to the bus;

a second device operably coupled to the bus;

a processing module operably coupled to the bus; and memory operably coupled to the processing module, wherein the memory stores operating instructions that, when executed by the processing module, cause the processing module to perform the functions of:

maintaining an operating system, wherein the operating system detects existing devices in the processing system and generates device enumeration requests based on the existing devices detected, wherein the operating system provides a user interface that allows a user to configure parameter settings for devices within the processing system, wherein the operating system issues configuration commands to modify parameter settings for the devices within the processing system; and maintaining a device driver corresponding to the first and second devices, wherein the device driver responds to device enumeration requests corresponding to the first device with an indication that the first device is inoperable, wherein the device driver responds to device enumeration requests corresponding to the second device with an indication device parameters corresponding to the second device, wherein when the device driver receives a configuration command corresponding to the second device, the device driver provides configuration information to the first and second devices based on the configuration command.

16. The processing system of claim 15, wherein the first and second devices are graphics processing devices.

17. The processing system of claim 16, wherein the first and second devices are included on a video graphics block coupled to the bus.

18. The processing system of claim 17, wherein the first and second devices are substantially similar graphics processing devices that include a set of configuration parameters that are configured using configuration commands.

19. The processing system of claim 18, wherein the first and second devices operate cooperatively to perform graphics processing functions.

20. The processing system of claim 19, wherein graphics processing functions performed by the first and second devices include performing graphics rendering operations.

21. The processing system of claim 20, wherein the set of configuration parameters for the first and second devices that is configured using configuration commands includes at least one of: resolution, color depth, texture processing, brightness, gamma correction, and refresh rate.

* * * * *